United States Patent Office 3,634,551
Patented Jan. 11, 1972

3,634,551
POLYBUTENE-1 BLENDS HAVING IMPROVED HEAT SEALABILITY
Arnold F. Stancell, Highland Park, and Malcolm P. Schard, Long Valley, N.J., assignors to Mobil Oil Corporation
No Drawing. Filed Mar. 20, 1969, Ser. No. 809,049
Int. Cl. C08f 29/12
U.S. Cl. 260—897 A                      1 Claim

ABSTRACT OF THE DISCLOSURE

By incorporating low density polyethylene (1–5 weight percent) into polybutene-1, heat seal strength is significantly increased. This is important in the formation of bags and other packaging from polybutene-1 film.

BACKGROUND OF THE INVENTION

Field of the invention

This invention is directed to blends of polybutene-1 with low density polyethylene. It is more particularly concerned with such blends that can be formed into films which are heat sealed to form seals of high seal strength.

Description of the prior art

As is well known to those familiar with the art, heat seals between layers of polybutene-1 in Form I have a negligible seal strength. When in Form II, seals of good strength are formed, but improved seal strength could be desired. Two general methods have been used to improve heat sealability of films. One of the methods, as shown in British Pat. No. 1,044,068, is to use an adherent coating of sealable material, e.g., polyethylene or polypropylene. Such a method, however, is costly and complicates the film forming operation. The other method is to incorporate into the polyolefin another component which increases sealability without materially affecting other film properties. This is demonstrated in Canadian Pat. No. 775,184 by blending polypropylene with polybutene-1 to improve sealability. The patentee requires, however, the use of at least ten percent and preferably thirty percent polypropylene. It will be appreciated that the use of smaller amounts of a second material incorporated into polybutene-1 will lessen the effect on other film properties.

SUMMARY OF THE INVENTION

This invention provides heat sealable blends comprising about 95–99 weight percent tactic polybutene-1 and about 5–1 weight percent low density polyethylene. It also provides a method for heat sealing polybutene-1, that comprises forming a blend of about 95–99 weight percent tactic polybutene-1 and about 5–1 weight percent low density polyethylene, forming said blend into a shape of thin cross sections, and applying heat to at least a portion of said shape for a period of time to effect a heat seal.

DESCRIPTION OF SPECIFIC EMBODIMENTS

Throughout the specification and claims, the term tactic" is a generic term applied to solid polymers in which there is an ordered structure with respect to the configurations around at least one main-chain site of steric isomerism per conventional base unit. Numerous types of tacticity are recognized in the art. Within the contemplation of this invention, a measure of steric order is the weight percent of the solid polymer that is insoluble in diethyl ether. A linear polybutene-1 that is insoluble in diethyl ether is considered to be tactic. Linear tactic polyolefins may be composed of isotactic or syndiotactic chains, blocks, or mixtures of these forms. The terms "isotactic" and "syndiotactic" are used in accordance with the definitions tentatively approved by the Commission on Macromolecules of the International Union of Pure and Applied Chemistry, as described in the Journal of Polymer Science, volume 56, pages 153–161 (1962). Tactic polymers can contain sequences of atactic (i.e., not tactic) units in conjunction with tactic sequences and still be insoluble in diethyl ether. These are tactic polymers within the contemplation of this invention.

The polymer for which improved heat sealability is provided by this invention is tactic polybutene-1. In general, the tactic polybutene-1 has an Isotactic Index (weight percent insoluble in diethyl ether) of about 80 or higher and, usually, about 90 or more. A feasible procedure for preparing tactic polybutene-1 is fully described in United States Letters Patent No. 3,362,940, to which reference can be made, although the source of the tactic polybutene-1 and the method of preparing it are not pertinent factors in this invention.

The material that is incorporated into tactic polybutene-1 is low density polyethylene (LDPE). This commercially available material is prepared by the well-known high pressure process and has a density in the range 0.910–0.925. It was found that high density polyethylenes gave erratic results and are not satisfactory for the purposes of this invention.

The blends of this invention contain, by weight, between about 95 percent and about 99 percent tactic polybutene-1 and between about 5 percent and about 1 percent LDPE. Blending can be effected by any of the methods known in the art, such as in a Banbury mixer, in an extruder, or on mixing rolls.

Additives, such as fillers, antioxidants, pigments, antistatic agents, slip agents, antitack agents and the like may be incorporated in the polymers before, during, or after the blending operation.

The blends of this invention can be formed by conventional means into a variety of shapes having a thin cross section, i.e., a thickness of 0.5–30 mils. Typical shapes include oriented or unoriented flat or tubular films or sheets which can be used for wrappings, bags, etc.; and lidded containers. Such shapes are conventionally heat sealed upon themselves or with another shape.

Heat sealing is effected by any of the conventional means known in the art, including hot wire, bar, and dielectric. An effective impulse sealer is described in U.S. Pat. No. 3,399,291. Depending upon various factors including thickness and type of sealer, dwell time generally is 0.5–2 seconds and sealing temperature is 255 to 350° F.

The following examples illustrate the blends of this invention and demonstrate the improved heat sealing characteristics thereof. Heat seal strength was determined on a standard tensile testing machine, in accordance with ASTM Designation D882. All parts are by weight.

EXAMPLE 1

Five parts of low density polyethylene pellets (0.92 density, 1.3 M.I. were blended with 95 parts of 0.71 M.I. tactical polybutene-1. The pellet blend was extruded and then re-extruded in a blown film line to form 2 ml film tubing. The tubing was aged five-six days to ensure conversion to Form I. Using four-layer gusseted configuration of this material, sealing was carried out on a conventional hot wire sealer at a 1.4 second dwell time. The resulting seal break strength was 4770 p.s.i. at an ultimate elongation of 271 percent. In comparison, polybutene-1 alone had a negligible seal strength.

EXAMPLE 2

The run of Example 1was repeated except that the film tubing was not aged (Form II). The seal using the blend had a breaking strength of 4530 p.s.i. and a 227 percent elongation, compared to 2700 p.s.i. and 85 percent for unmodified polybutene-1.

EXAMPLE 3

A conventional bar sealer was used in another set of runs similar to those of Examples 1 and 2. Film samples 2 mils thick were sealed in a gusseted configuration. Sealing temperature was 315° F. and dwell time was 0.9 second at 30 p.s.i. The results of seal strength are set forth in the following table.

TABLE

| Film sample | Crystal form I | Crystal form II |
|---|---|---|
| Polybutene-1 (PB-1) | Negligible | 3,040 p.s.i. at 116% elongation. |
| 95% PB-1 + 5% LDPE | 2,250 p.s.i. at 42% elongation. | 4,420 p.s.i. at 200% elongation. |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claim.

What is claimed is:

1. Heat sealable blends comprising, by weight, between about 95 percent and about 99 percent tactic polybutene-1 having a Isotactic Index of at least 80 and between about 5 percent and about 1 percent low density polyethylene.

References Cited

UNITED STATES PATENTS 3,050,497   8/1962   Young _____ 260—45.5

FOREIGN PATENTS 775,184   2/1968   Canada _____ 260—897

MURRAY TILLMAN, Primary Examiner

C. J. SECCURO, Assistant Examiner

U.S. Cl. X.R.

156—309, 334; 161—252; 264—95, 176